United States Patent Office 3,554,885
Patented Jan. 12, 1971

3,554,885
PROCESS FOR PREPARING NITROSO-SUBSTI-
TUTED ESTERS OF FLUOROCARBON ACIDS
Ward H. Oliver, Mobile, Ala., assignor, by mesne assign-
ments, to PCR, Inc., a corporation of Florida
No Drawing. Continuation-in-part of application Ser. No.
586,664, Oct. 14, 1966. This application May 2, 1968,
Ser. No. 726,203
Int. Cl. B01j 1/10; C07c 81/08
U.S. Cl. 204—158
8 Claims

ABSTRACT OF THE DISCLOSURE

Compounds of the formulas

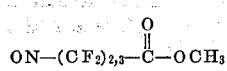

and

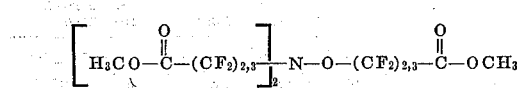

are produced by reacting methyl nitrite and perfluoroglu-
taric anhydride or perfluorosuccinic anhydride and then
decarboxylating the resultant product. The compounds,
which can be hydrolyzed to produce the corresponding
nitroso-substituted fluorocarbon acids, are used as
comonomers in nitroso rubbers.

This application is a continuation-in-part of appli-
cation Ser. No. 586,664, filed Oct. 14, 1966, now aban-
doned.

BACKGROUND OF THE INVENTION

Perfluorinated organic nitroso compounds have been
known in the prior art. It has been suggested that nitro-
soalkanes may be made by reacting a fluorine-containing
anhydride with a nitrosyl halide to produce the cor-
responding fluorinated acyl nitrite, which may be sub-
sequently converted by decarboxylation to the correspond-
ing nitrosoalkane. It has also been suggested to produce
the fluorinated acyl nitrite by reacting a fluorine-
containing acid salt of a metal with a nitrosyl halide,
and thereafter converting to the corresponding nitrosoal-
kane by decorboxylation.

British patent specification 1,014,221 discloses a proc-
ess for producing perfluorinated acyl nitrites in almost
quantitative yield by reacting a metal perfluorocarboxyl-
ate with a nitrosyl halid. The acyl nitrites so produced
may be either pyrolyzed or subjected to photochemical
decarboxylation to produce perfluoroalkyl-nitroso com-
pounds.

Hazeldine U.S. Pat. No. 3,083,237, issued Mar. 26,
1963, discloses a process for producing fluorinated nitroso
compounds by reacting a fluorine-containing organic bro-
mide with nitric oxide. The fluorinated nitroso compounds
so produced may be polymerized with fluoroalkenes and
fluorodienes to form useful copolymers.

Crawford, et al., U.S. Pat. No. 3,192,246, issued June
29, 1965, discolses a process for producing a halogen-
containing alkyl nitrite by reacting an aliphatic anhy-
dride containing fluorine or other halogen atoms with a
nitrogen sesquioxide (N₂O₃). Crawford et al. disclose
that the nitrosoalkanes formed by their processes are
useful as copolymers with tetrafluoroethylene to pro-
duce useful plastic or elastomeric copolymers. Specifically,
the copolymer of trifluoronitrosomethane and tetraflu-
oroethylene is a nitroso rubber with good low tempera-
ture flexibility and excellent solvent resistance.

The Crawford et al. U.S. Pat. No. 3,162,692, issued
Dec. 22, 1964, discusses problems involved with the
known decarboxylation processes for converting fluori-
nated acyl nitrites to the corresponding nitrosoalkanes.
The Patentees state that both pyrolysis and Photolytic
decarboxylation processes have not been satisfactory, and
disclose a process wherein trifluoroacetyl nitrite is de-
carboxylated in the presence of a refluxing inert solvent
at a pressure sufficient to maintain the trifluoroacetyl
nitrite in the liquid phase at the decarboxylation tem-
perature (the priro art pyrolysis was carried out in the
vapor phase).

The Park et al. U.S. Pat. No. 3,160,669, issued
Dec. 8, 1964, discloses a process for producing poly-
fluorinated nitroso acylates by reacting nitrosyl halide
with anhydrides of polyfluorinated organic acids.

The Crawford et al. Pat. No. 3,192,260, issued June
29, 1965, discloses the preparation of omega nitroso
perfluoropropionic acid, of the structure: HO₂C CF₂
CF₂NO and also omega nitroso perfluorobutyric acid.
In both cases, the acid is produced by hydrolyzing omega
nitroso perfluoroacyl nitrite.

SUMMARY OF THE INVENTION

Methyl nitrite will react with perfluoroglutaric anhy-
dride or perfluorosuccinic anhydride to give essentially
quantitative yields of the corresponding nitrite-ester. The
nitrite-ester can be decarboxylated to give new nitroso
monomers which contain an ester group. This ester
group is of special interest, as the nitroso-substituted
esters can be copolymerized or terpolymerized to pro-
duce a nitroso rubber which will have pendent ester
groups, which provide sites for subsequent cross-linking,
or curing, of the nitroso rubber polymer. The nitroso-
ester process produces the corresponding tri-ester as a
by-product.

In addition, the nitroso-substituted esters of fluoro-
carbon acids may be hydrolyzed to produce the corres-
ponding nitroso substituted fluorocarbon acids.

DESCRIPTION OF THE INVENTION

Methyl nitrite will react with perfluoroglutaric anhy-
dride or perfluorosuccinic anhydride by the following
equation:

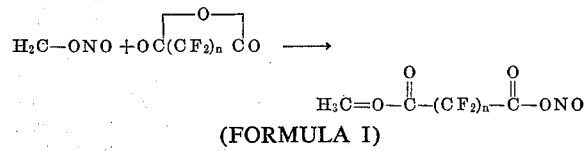

(FORMULA I)

wherein $n$ is 2 or 3.

The nitrite-ester can be decarboxylated to form the
nitroso-substituted ester (hereinafter sometimes called
"nitroso ester") by the following reaction:

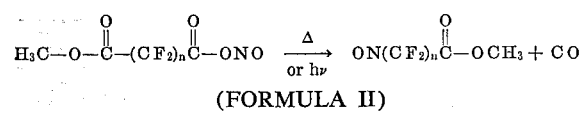

(FORMULA II)

The nitroso-substituted esters of fluorocarbon acids produced by the reaction of Formula II are useful monomers for the preparation of nitroso rubbers. The nitroso-substituted ester can be copolymerized with fluorine-containing olefins, or may be terpolymerized with fluorine-containing olefins and perfluoro or chlorofluoro nitrosoalkanes. An example of a suitable fluorine-containing olefin is tetrafluoroethylene, and trifluoronitrosomethane can be mentioned as an example of the fluorinated nitrosoalkanes. The monomers polymerize readily at temperatures of −30° C. to −40° C., without requiring the use of a catalyst. This polymerization is described in the copending application of Ward H. Oliver and Eugene C. Stump, Jr., filed Oct. 14, 1966, entitled "Nitroso Rubber Polymers Containing Nitroso-Substituted Esters of Fluorocarbon Acids," Ser. No. 586,677 now Pat. No. 3,472,872, the disclosure of which is hereby incorporated by reference.

The methyl nitrile will react with the anhydrides at temperatures from about −20° C. up to elevated temperatures, with the liberation of exothermic heating, without requiring the presence of a catalyst. The reactants can be condensed in a closed tube or the gaseous nitrite can be passed through liquid anhydride, for example. Generally, it is preferred that the reaction temperature be below the boiling point of the anhydride, and most preferably the reaction temperature is within the range of about 20° C. to about 50° C. Although the methyl nitrite and the anhydride are preferably mixed in equal molar amounts, the scope of the present invention contemplates a reaction of a mixture which may contain from 30 to 70 mole percent of methyl nitrite and 70 to 30 mole percent of the anhydride.

The methyl nitrite and the anhydride are mixed together, preferably by condensing into a reaction vessel, at reduced temperatures, e.g., −78 to −196° C., and thereafter brought to a temperature at which the materials react, e.g., room temperature or 20 to 50° C. The pressure for this reaction may be, for example, in the range of 400 mm. Hg to 10 atmospheres. Generally, the reaction will proceed under autogenous pressure.

The reaction products of methyl nitrite with perfluoroglutaric anhydride and perfluorosuccinic anhydride have been identified by infrared, NMR, and elemental analysis. The infrared spectrum shows, for each compound, typical methyl, nitrite, and ester absorption, as well as strong C-F absorption. The glutarate was pyrolyzed under total vacuum at 200–250° C. Trap-to-trap distillation of the resulting blue product gave $CH_3O_2C(CF_2)_3NO$ which was essentially pure, in a yield of about 47%. The infrared spectrum of this product showed typical methyl, ester and nitroso absorption. The NMR spectrum, using acetaldehyde and trifluoroacetic acid as references, is shown below:

| Peak | Chemical shift | Pattern | Rel. area | Assignment |
|---|---|---|---|---|
| H | 6.88 tau | Singlet | | $CH_3O$. |
| F-A | +38.9 p.p.m | $A_2B_2$ pattern | 7.3 | End $CF_2$'s. |
| F-B | +42.9 p.p.m | | 7.2 | |
| F-C | +48.9 p.p.m | Singlet | 7.1 | Middle $CF_2$. |

Similarly, the succinate was pyrolyzed and the resulting blue product purified. Reduced conversions or yields, in the order of about 20%, were obtained with this compound. The low yield is partially due to the formation of a colorless liquid, subsequently identified as the triester, which was formed and removed during the pyrolysis. The infrared spectrum showed the characteristic peaks expected for $CH_3O_2C(CF_2)_2NO$. The NMR spectrum was obtained as shown below:

| Peak | Chemical shift | Pattern | Rel. area | Assignment |
|---|---|---|---|---|
| H | 6.83 tau | Singlet | | $CH_3O$. |
| F-A | +40.2 p.p.m | Barely resolvable doublet | 5.7 | $CH_2$. |
| F-B | +43.3 p.p.m | do | 5.8 | $CF_2$. |

The decarboxylation process can be by pyrolysis at temperatures of about 150 to about 350 degrees C., preferably 150 to 250° C., or by photolysis by ultraviolet light. A Hanovia lamp 8A36 may be used to provide the sources of ultraviolet rays. Pyrolysis temperatures about 300° C. generally result in some decomposition of the materials, especially at temperatures above 350° C. Temperatures below 150° C. are generally too low for acceptable rates of decarboxylation. The decarboxylation process may be at reduced pressures up to a pressure of 1 atmosphere, e.g., from about .01 to about 760 mm. Hg. Low pressures are preferred for the decarboxylation step, e.g., .01 to 5 mm. Hg. Pyrolysis may be carried out in any of several different ways; e.g., by dropping the nitrite into a heated column from the top, or into a heated pot at the bottom, and thereafter trapping the product in a cold trap.

One by-product of the preparation of nitroso-substituted methyl ester of perfluorobutyric acid is a triester which has the following structural formula:

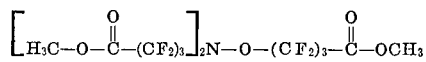

as identified by NMR and elemental analysis. The NMR spectrum using tetramethylsilane and trifluoroacetic acid as references, is as follows:

| Designation | Chemical shift | Pattern and splitting | Rel. area | Assignment |
|---|---|---|---|---|
| H | 6.22 tau | Sharp singlet | | $-OCH_3$- |
| F, A | +10.2 p.p.m | Broad | 2.6 | $-CF_2O$ |
| B, C | +17.2 p.p.m | Non-equiv. quartet, broad. | 4.7 | $-CF_2N$ |
| D | +41.2 p.p.m | Broad, overlapping peaks. | 9.0 | $-CF_2CO_2$ |
| E | +43.5 p.p.m | Broad | 5.1 | $-CF_2-$ |
| F | +47.8 p.p.m | do | 2.5 | $-CF_2-$ |

A similar triester of the formula:

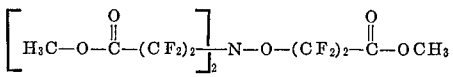

is obtained as a by-product in the preparation of the nitroso-substituted methyl ester of perfluoropropionic acid.

These triesters can be conventionally converted by way of a triamide into a trinitrile which is useful as a cross-linking agent, e.g., for polyamides, or as an intermediate in the production of triazine compounds. The triesters are produced in about the same relative proportions as the nitroso-substituted perfluorocarboxylic acid ester, e.g., in an amount of about 20–25 percent, in the decarboxylation process, either pyrolysis or photolysis.

The compounds of the present invention have the generic formula:

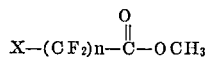

wherein $n$ is 2 or 3 and X is —NO or

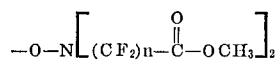

provided that, in the case of the triester, all $n$'s are the same.

The nitroso-substituted esters of the present invention can be converted into the corresponding nitroso-substituted acids by conventional hydrolysis procedures whereby the acids produced are of high purity. Such acids may be utilized to produce nitroso rubber terpolymers, as disclosed in the Crawford et al. Pat. 3,192,260. It is difficult to obtain the acid in high purity by the prior art methods. While this nitroso-substituted acid product is not unique, the present process is a novel means of producing such a product. Thus, the present invention also contemplates a novel process for producing nitroso-substituted fluorocarbon acids, by hydrolyzing the nitroso-substituted esters of fluorocarbon acids. The hydrolysis may be under neutral or acidic conditions, but basic conditions should be avoided. The nitroso esters may be stirred into water at room temperature and after about 5 days the nitroso esters will be converted into the nitroso-substituted fluorocarbon acid. The nitroso ester is insoluble in water but the insoluble phase gradually disappears, as the soluble acid is formed by hydrolysis. The acid may be recovered from solution, for example, by salting out with an excess of sodium chloride or by extracting with ethyl acetate or methylene chloride. The hydrolysis reaction proceeds faster at elevated temperatures, e.g., 95 to 100° C. although it may be conducted at lower temperature, e.g., 50° C. Alternatively, the nitroso ester may be hydrolyzed by using an acid, e.g., concentrated sulphuric acid, to effect the hydrolysis. In general, the nitroso ester is hydrolyzed by contacting the same with water containing from 0 to about 98% by weight of a strong mineral acid, such as sulfuric acid, at a temperature of about 5° C. to about 100° C., preferably about 25° C. to about 50° C., until the hydrolysis reaction is complete.

The invention will be understood more readily by reference to the following examples; however, these examples are intended to illustrate the invention and are not to be construed to limit the scope of the invention.

EXAMPLE I

Preparation of starting compounds (a) Preparation of methyl nitrite.—Methanol (32 g., 1 mole) was dissolved in an equal volume of water and added to a flask containing NaNO₂ (70 g.). The mixture was stirred and conc. H₂SO₄ slowly added. The evolved gas was passed through a CaCl₂ tube and collected in a trap cooled in liquid air. The product (57 g., 93% yield) was condensed into a cylinder.

(b) Preparation of perfluoroglutaric anhydride.—Perfluoroglutaryl chloride (910 g., 3.3 moles) was slowly added with stirirng to 150 ml. water in a 31. flask. After the acid chloride had been added, the water was removed by azeotroping with benzene. The benzene was distilled off at atmospheric pressure, then by aspirator. Excess P₂O₅ was then mixed thoroughly with the perfluoroglutaric acid and heated. The anhydride was collected (600 g., 83% yield) directly by distillation.

(c) Preparation of perfluorosuccinic anhydride.—Perfluorosuccinic acid (200 g., 1.05 moles) was mixed with excess P₂O₅ in a 1 l. flask. The mixture was heated and perfluorosuccinic anhydride (141 g., 0.82 mole) was removed by distillation as formed.

EXAMPLE II

Preparation of $CH_3O_2C(CF_2)_3COONO$

Methyl nitrite (12.2 g., 0.2 mole) and perfluoroglutaric anhydride (44.4 g., 0.2 mole) were condensed into a Fischer-Porter tube and allowed to come to room temperature. The tube was shaken sufficiently to insure complete mixing. The tube soon became warm and cooled again after about 1½ hours. The color became amber. Unreacted starting material was removed at reduced pressure; yield was practically quantitative.

*Analysis.*—Calcd. for $C_6H_3F_6NO_5$ (percent): C, 25.44; H, 106; F, 40.28. Found (percent): C, 25.70; H, 1.28; F, 40.53.

EXAMPLE III

Preparation of $CH_3O_2C(CF_2)_3NO$

The product produced by Example II was decarboxylated by the following procedure:

A 250 ml., 2-neck flash was fitted with an addition funnel containing $CH_3O_2C(CF_2)_3COONO$ (33.0 g., 0.116 mole) and a 15″ Vigreaux column vented to a vacuum system through a trap cooled to −183° C. A complete vacuum (less than 0.1 mm. Hg) was maintained throughout the system as the nitrite was dropped into the flask which was heated to 200°. The column was heated to 250° C. After the pyrolysis was completed, the material in the −183° C. trap was allowed to warm to room temperature, the nitrogen oxides were removed under vacuum, and the blue liquid residue was washed with water. The blue product was separated and distilled twice by boiling from one trap to another under vacuum, discarding the last several ml. of liquid each time. A GLC of the final product showed it to be 100% pure. The deep blue liquid product obtained weighed 13.0 g. This represents a 47% yield of $CH_3O_2C(CF_2)_3NO$.

*Analysis.*—Calcd. for $C_5H_3F_6NO_3$ (percent): C, 25.11; H, 1.26; F, 47.67. Found (percent): C, 25.3; H, 1.17; F, 47.7.

EXAMPLE IV

The product produced by Example II was decarboxylated in a manner similar to Example 3 except that the decarboxylation reaction was at atmospheric pressure. A lower yield of the nitroso-substituted ester was obtained than reported for Example III.

EXAMPLE V

Preparation of $CH_3O_2C(CF_2)_2COONO$

Methyl nitrite (12.2 grams, 0.2 mole) and perfluorosuccinic anhydride (34.2 grams, 0.2 mole) were reacted following the procedure for Example II with similar results.

*Analysis.*—Calcd. for $C_5H_3F_4NO_5$ (percent): C, 25.76; H, 1.29; F, 32.60. Found (percent): C, 25.84; H, 1.33; F, 36.91.

EXAMPLE VI

Preparation of $CH_3O_2C(CF_2)_2NO$

A 250 ml., 2-neck flask was fitted with an additional funnel containing $CH_3O_2C(CF_2)_2COONO$ (52 g., 0.223 mole) and a 15″ Vigreaux column which was fitted with an air-cooled condenser constructed on the order of a Dean-Stark apparatus. The condenser was vented to a vacuum system through a −183° C. trap, and a total vacuum was maintained throughout the system as the nitrite was dropped into the flask which was heated to 200° C. The Vigreaux column was seated to 250° C. After the pyrolysis had been going for several minutes, a blue product collected in the −183° C. trap and a colorless liquid began to condense in the air-cooled condenser. This liquid was periodically removed. The −183° C. trap was allowed to warm to room temperature and the remaining product was washed with water. The blue product was separated and distilled twice by distilling from one trap to another under vacuum, discarding the last several ml. of liquid each time. A GLC of the final product showed it to be 100% pure. An infrared spectrum was made of this deep blue liquid which weighed 8.3 g. This represents a 20% yield of $CH_3O_2C(CF_2)_2NO$.

*Analysis.*—Calcd. for $C_4H_3F_4NO_3$ (percent: C, 25.40; H, 1.60; F, 40.21. Found (percent): C, 25.66; H, 1.72; F, 40.42.

EXAMPLE VII

Preparation of $[H_3C-O-\overset{O}{\underset{\|}{C}}-(CF_2)_3]_2N-O-(CF_2)_3-CO_2CH_3$ Pyrolysis of the nitrite ester, as set forth in Example III gives a higher boiling, clear fraction in addition to the blue nitroso ester. This material is a triester resulting from radical combination. The higher boiling material (B.P. ∼137–140° C. at 0.1 mm. Hg) is formed in about the same conversion (21–24) as the nitroso ester. An infrared spectrum shows typical ester absorption as well as C=H absorption. Pyrolysis at higher temperatures (350°–400°) results in the formation of a high-boiling purple liquid, possibly a nitroxide. Photolysis of the nitrite ester gives, in addition to higher boilers, by-products which apparently contain a nitro group.

EXAMPLE VIII

Photolytic decarboxylation

Decarboxylation of $CH_3O_2C(CF_2)_3COONO$ was effected U.V. light. Nitrite (40 g.) was placed into a liter flask (equipped with an immersion well and No. 8A36 Hanovia lamp) which was connected to a vacuum system through a $-195°$ trap. Irradiation was continued for 48 hrs. while a 0.1 mm. pressure was maintained. Combining the blue product of a similar reaction using 33 g. of nitrite gave 12 g. fractionated

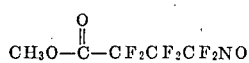
$$CH_3O-\overset{\overset{O}{\|}}{C}-CF_2CF_2CF_2NO$$

(20%). Another product having a green color was indicated by infrared analysis to be a nitro compound.

EXAMPLE IX

Hydrolysis of $CH_3O_2C(CF_2)_3NO$ $CH_3O_2C(CF_2)_3NO$ (15 g.) was placed into 100 ml. of water and stirred at room temperature. The amount of insoluble ester gradually decreased and the solution turned blue due to the dissolved nitroso-acid. When complete hydrolysis had occurred (5 days), the solution was saturated with sodium chloride, causing a blue liquid, identified as $HOOC(CF_2)_3NO$, to separate. The nitroso-acid was dried with anhydrous sodium sulfate to give 12 g. of $$HOOC(CF_2)_3NO$$

An infrared spectrum of this compound exhibits typical nitroso and carboxylic acid absorption peaks.

EXAMPLE X

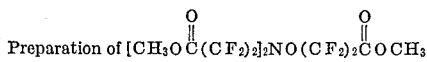
Preparation of $[CH_3O\overset{\overset{O}{\|}}{C}(CF_2)_2]_2NO(CF_2)_2\overset{\overset{O}{\|}}{C}OCH_3$ Pyrolysis of the nitrite ester, as set forth in Example VI, gives a higher boiling, colorless material in addition to the blue nitroso ester. This material was identified as the triester $[CH_3O_2C(CF_2)_2]_2NO(CF_2)_2CO_2CH_3$ by elemental, infrared, and NMR analysis.

*Analysis.*—Calcd. for $C_{12}H_9F_{12}NO_7$ (percent): C, 28.40; H, 1.78; F, 45.00; N, 2.76. Found (percent): C, 28.52; H, 1.99; F, 45.03; N, 3.98.

The infrared spectrum of the liquid exhibited distinctive peaks at 3.37, 5.60, 6.91, 7.50, 8.32, 8.75, 9.62, and 9.80 microns.

The NMR spectrum using acetaldehyde and trifluoroacetic acid as references is as follows:

| Designation | Chemical shift | Pattern and splitting | Rel. area | Assignment |
|---|---|---|---|---|
| H | 6.14 tau | Singlet | | $-OCH_3$ |
| F-A | + 12.7 p.p.m | Broad | 8.00 | $-CF_2O-$ |
| B | + 19.8 p.p.m | Doublet | 16.00 | $-CF_2N-$ |
| C | + 39.5 p.p.m | Broad | 19.9 | $-CF_2\overset{\overset{O}{\|}}{C}-$ |
| D | + 43.1 p.p.m | do | 19.3 | $-CF_2\overset{\overset{O}{\|}}{C}-$ |

Obviously many modifications and variations of the present invention are possible in the light of the above teachings. It is, therefore, to be understood that within the scope of the appended claims, the invention may be practiced otherwise than as specifically described.

What is claimed is:

1. A process for preparing a product of the formula $$CH_3OCO-(CF_2)_n-NO$$

wherein $n$ is an integer from 2 to 3 inclusive, which comprises: reacting methyl nitrite with a compound of the formula

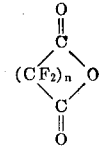

wherein $n$ is an integer from 2 to 3 inclusive, to form a carbomethoxyperfluoroalkyl nitrite; decarboxylating said carbomethoxyperfluoroalkyl nitrite to form said product; recovering said product.

2. A process for producing nitroso-substituted esters of fluorocarbon acids comprising reacting from about 75 to about 25 mole percent of methyl nitrite and about 25 to about 75 mole percent of a member selected from the group consisting of perfluoroglutaric anhydride and perfluorosuccinic anhydride at a temperature of about $-20°$ C. up to the boiling point of said member, whereby an intermediate nitrite-ester is produced, and thereafter decarboxylating the nitrite-ester by pyrolysis at a temperature of about 150 to about 350° C., whereby said nitroso-substituted ester of a fluorocarbon acid is produced.

3. The process as claimed in claim 2, wherein said pyrolysis is at a temperature of 150 to 250° C.

4. The process as claimed in claim 11, wherein said reaction of methyl nitrite and said member is at a temperature of about 20 to about 50° C.

5. The process as claimed in claim 2, wherein about equal molar amounts of said methyl nitrite and said member are reacted.

6. A process for producing nitroso- substituted esters of fluorocarbon acids comprising reacting from about 75 to about 25 mole percent of methyl nitrite and about 25 to about 75 mole percent of a member selected from the group consisting of perfluoroglutaric anhydride and perfluorosuccinic anhydride at a temperature of about $-20°$ C. up to the boiling point of said member, whereby an intermediate nitrite-ester is produced, and thereafter decarboxylating the nitrite-ester by photolysis with ultraviolet light, whereby said nitroso-substituted ester of a fluorocarbon acid is produced.

7. The process as claimed in claim 6, wherein said reaction of methyl nitrite and said member is at a temperature of about 20 to about 50° C.

8. The process as claimed in claim 6, wherein about equal molar amounts of said methyl nitrite and said member are reacted.

References Cited

UNITED STATES PATENTS

| | | | |
|---|---|---|---|
| 3,160,660 | 12/1964 | Park et al. | 260—539X |
| 3,192,260 | 6/1965 | Crawford Jr. et al. | 260—539 |
| 3,267,134 | 8/1966 | Bissell | 260—487 |
| 3,342,874 | 9/1967 | Taylor | 260—539X |

LORRAINE A. WEINBERGER, Primary Examiner

J. L. DAVISON, Assistant Examiner

U.S. Cl. X.R.

260—78, 78.4, 78.5, 87.5, 92.1, 345.9, 346.8, 465.7, 466, 485, 487, 537, 539, 561

UNITED STATES PATENT OFFICE
CERTIFICATE OF CORRECTION

Patent No. 3,554,885          Dated January 12, 1971

Inventor(s) Ward H. Oliver et al

It is certified that error appears in the above-identified patent and that said Letters Patent are hereby corrected as shown below:

Column 2, line 52, in the structural formula, "$H_2C-$" should be "$H_3C-$".

Same column, line 55, in the structural formula, "$H_3C=O$" should be "$H_3C-O$".

Column 3, line 19, "nitrile" should be "nitrite".

Column 6, line 70, "C=H" should be "C-H".

Column 8, line 29 (claim 4) "11" should be "2".

Signed and sealed this 4th day of January 1972.

(SEAL)
Attest:

EDWARD M. FLETCHER, JR.        ROBERT GOTTSCHALK
Attesting Officer               Acting Commissioner of Paten